(12) United States Patent
Kasazumi et al.

(10) Patent No.: US 7,773,486 B2
(45) Date of Patent: Aug. 10, 2010

(54) TWO-DIMENSIONAL PHOTORECEPTOR ARRAY, HOLOGRAPHIC OPTICAL INFORMATION PLAYBACK DEVICE, AND HOLOGRAPHIC OPTICAL INFORMATION RECORDING DEVICE

(75) Inventors: Kenichi Kasazumi, Takatsuki (JP); Kiminori Mizuuchi, Neyagawa (JP); Kazuhisa Yamamoto, Takatsuki (JP)

(73) Assignee: Panasonic Corporation, Osaka (JP)

( * ) Notice: Subject to any disclaimer, the term of this patent is extended or adjusted under 35 U.S.C. 154(b) by 1491 days.

(21) Appl. No.: 10/969,919

(22) Filed: Oct. 22, 2004

(65) Prior Publication Data
US 2005/0111335 A1 May 26, 2005

(30) Foreign Application Priority Data
Oct. 24, 2003 (JP) .............................. 2003-365328

(51) Int. Cl.
*G11B 7/00* (2006.01)
(52) U.S. Cl. .................................. 369/103; 369/124.03
(58) Field of Classification Search ........................ None
See application file for complete search history.

(56) References Cited

U.S. PATENT DOCUMENTS

| 5,060,074 | A | 10/1991 | Kinugasa et al. |
| 5,777,760 | A | 7/1998 | Hays et al. |
| 6,803,153 | B1 * | 10/2004 | Kawano et al. ................. 430/1 |
| 6,958,967 | B2 | 10/2005 | Kasazumi et al. |
| 2002/0075776 | A1 | 6/2002 | Kasazumi et al. |

FOREIGN PATENT DOCUMENTS

| CN | 1375822 | 10/2002 |
| JP | 2000-357342 | 12/2000 |
| JP | 2002-216359 | 8/2002 |
| WO | 97/43669 | 11/1997 |

OTHER PUBLICATIONS

European Search Report issued Jun. 9, 2007 in the European Patent Application EP 04 02 5132.

* cited by examiner

*Primary Examiner*—Paul Huber
(74) *Attorney, Agent, or Firm*—Wenderoth, Lind & Ponack, L.L.P.

(57) ABSTRACT

A holographic optical information playback apparatus for playing information that is recorded on a recording medium in a form of interference fringes is provided with a two-dimensional photoreceptor array which receives a two-dimensional array of light spots that is diffracted at the recording medium due to application of reference light onto the medium, and outputs a playback signal including information recorded on the recording medium. The two-dimensional photoreceptor array has a photoreceptor section in which plural photoreceptor cells for detecting the intensities of received lights are arranged so that a photoreceptive area corresponding to the light spot array is formed, and assigns plural photoreceptor cells are assigned to each light spot in the light spot array according to the irradiation position of the light spot array, whereby the light intensity of one light sport is detected using the output signals from the plural photoreceptor cells.

5 Claims, 7 Drawing Sheets

31 light spot 30 two-dimensional photoreceptor array 31 light spot 30 two-dimensional photoreceptor array

TWO-DIMENSIONAL PHOTORECEPTOR ARRAY, HOLOGRAPHIC OPTICAL INFORMATION PLAYBACK DEVICE, AND HOLOGRAPHIC OPTICAL INFORMATION RECORDING DEVICE

FIELD OF THE INVENTION

The present invention relates to a two-dimensional photoreceptor array, and a holographic optical information playback device and a holographic optical information recording device which employ the two-dimensional photoreceptor array.

BACKGROUND OF THE INVENTION

A compact disc (CD) enables recording of 74 minutes of music data and recording of 650 MB of digital data by using an optical system including a light source having a wavelength of 780 nm and an objective lens having a numerical aperture of 0.45. On the other hand, a digital versatile disc (DVD) enables recording of two hours and fifteen minutes of motion picture based on MPEG2 or 4.7 GB of digital data, by using an optical system including a light source having a wavelength of 650 nm and an objective lens having a numerical aperture of 0.6.

Further, in recent years, high-density and large-capacity optical discs have been increasingly expected because high-definition motion pictures having 1000 or more lines of horizontal resolution have been broadcast, and performances of personal computers have been enhanced. In order to meet the expectation, there has been proposed an optical disc system in which a light source having a wavelength of about 400 nm and an objective lens having a numerical aperture of 0.85 are combined, thereby to realize a recording capacity exceeding 20 GB per side.

As described above, in the conventional optical disc device, an increase in the recording density of data on the disc has been realized by using a light source having a shorter wavelength and an objective lens having a larger numerical aperture. However, higher-density recording by the shorter wavelength and larger numerical aperture is approaching its limit. To be specific, in an area having a wavelength of 400 nm or shorter, since the wavelength dispersion of a glass material used for the lens is increased, it is difficult to control the aberration. Further, when employing a solid immersion lens which is under development for larger numerical aperture, the operating range of the lens, i.e., the distance between the lens and the disc, is extremely short (about 50 nm), resulting in difficulty in replacing the disc.

In order to resolve these problems and further increase the recording density of data on the disc, the holographic recording technique receives widespread attention.

FIG. 7 is a diagram for explaining a shift-multiplexed recording type optical disc system which has been proposed by Psaltis et al., illustrating a schematic construction of the optical disc system.

A shift-multiplexed recording type optical disc system 200 shown in FIG. 7 comprises a laser source 1, a beam expander 7, a half mirror 8, a mirror 10, a spatial light modulator 2, a Fourier transform lenses 3 and 4, a hologram disc 5, a convergence lens 11, and a two-dimensional photoreceptor array 6.

A laser beam emitted from the laser source 1 is increased in its beam diameter by the beam expander 7 and then split by the half mirror 8. The traveling direction of one of the split beams is changed by the mirror 10 so that the beam passes through the spatial light modulator 2. The beam which has passed through the spatial light modulator 2 is converged by the Fourier transform lens 3 and directed onto the hologram disc 5 as a signal light 20. The other beam is converged by the convergence lens 11 to become a reference light 22, and the reference light 22 is directed onto the same position in the hologram disc 5 as the position where the signal light 20 is directed.

The hologram disc 5 has a construction in which a hologram medium such as photopolymer is sealed between two glass substrates, and interference fringes of the signal light 20 and the reference light 22 are recorded in the hologram medium.

The spatial light modulator 2 has an optical switch array in which plural optical switches are two-dimensionally arranged, and the respective optical switches are turned on and off according to an input signal 23. Each optical switch is a cell corresponding to one bit of video information. For example, the spatial light modulator 2 having 1024×1024 cells can display 1M bits of information simultaneously. When the light beam passes through the spatial light modulator 2, the 1M bits of information displayed on the spatial light modulator 2 are converted into a two-dimensional light beam array and then converged by the Fourier transform lens 3.

When playing the recorded signal, only the reference light 22 is applied onto the hologram disc 5. Then, a playback signal light 21 as a diffracted light from the hologram 5 passes through the Fourier transform lens 4 to be converted into a two-dimensional light beam array, and this light beam array is applied onto the two-dimensional photoreceptor array 6. The two-dimensional photoreceptor array 6 comprises photoreceptors which are arranged two-dimensionally, and the arrangement of the photoreceptors corresponds to the arrangement of the optical switches in the spatial light modulator 2. Accordingly, in the two-dimensional photoreceptor array 6, the respective light beams in the two-dimensional light beam array are light-to-electricity converted by the corresponding photoreceptors, and a playback signal 24 is outputted.

The optical disc system 200 shown in FIG. 7 is characterized as follows. That is, since the hologram medium is as thick as about 1 mm, the interference fringes are recorded as thick gratings, i.e., Bragg gratings. Therefore, it is possible to carry out angle-multiplexed recording, i.e., information can be recorded with varying the incident angles of the signal light and the reference light onto the optical disc, resulting in an increase in the amount of information to be recorded on the optical disc. In the optical disc system shown in FIG. 7, the angle multiplexing is realized by shifting the irradiation position of the spherical wave reference light, instead of varying the incident angle of the reference light 22. That is, it is realized by utilizing that the reference light incident angle sensed by each portion of the medium slightly changes when the hologram disc 5 is slightly rotated to shift the recording position.

Next, the operation of the two-dimensional photoreceptor array 6 will be specifically described.

When the two-dimensional light beam array is applied onto the two-dimensional photoreceptor array, a playback signal light spot array in which playback signal light spots are arranged two-dimensionally is formed on the surface of the photoreceptor array.

FIG. 8 shows the layout of the playback signal light spot array on the two-dimensional photoreceptor array. The respective light spots 25 one-by-one correspond to the respective photoreceptor cells 9 in the two-dimensional photoreceptor array 6, and the light intensity of each optical spot 9 is detected by the corresponding photoreceptor cell 6.

In FIG. 8, solid-line circles indicate the playback signal light spots 25 on the respective photoreceptor cells in the state where the positional relationships among the Fourier transform lens 3, the hologram disc 5, and the two-dimensional photoreceptor array 6 are appropriate in the optical disc system shown in FIG. 7. Each light spot 25 is positioned in the center of the corresponding photoreceptor cell 9. Further, dotted-line circles indicate the playback signal light spots 25 on the respective photoreceptor cells in the state where the light source wavelength becomes shorter than the optimum value during playback. As for the position of each light spot 25 in the corresponding photoreceptor cell 9, the farther the photoreceptor cell is apart from the center of the two-dimensional photoreceptor array, the more the corresponding light spot 25 deviates from the center of the photoreceptor cell toward the center of the photoreceptor array.

That is, when the light source wavelength becomes shorter during playback, the diffraction angle of the reference light at the hologram disc 5 becomes smaller, whereby the expanse of the playback signal light spot array becomes narrower. Further, although it is not shown in FIG. 8, when the hologram disc 5 inclines, the direction of diffraction of the reference light changes with the inclination of the disc, and therefore, the playback signal light spot array horizontally shifts from the proper position on the two-dimensional photoreceptor array. Further, when there is an eccentricity of the hologram disc 5, the playback signal light spot array undesirably rotates on the two-dimensional photoreceptor array in agreement with the disc rotation.

When there occurs the deviation of the light source wavelength or inclination or eccentricity of the hologram disc 5 as described above, the position of each light spot 25 on the two-dimensional photoreceptor array shifts and, if the light spot 25 is applied over plural photoreceptor cells, the light intensity of the light spot 25 cannot be correctly detected.

Japanese Published Patent Application No. 2002-216359 discloses a countermeasure against such position deviation.

The technique disclosed in this literature will be described with reference to FIG. 9.

As shown in FIG. 9, with respect to photoreceptor cells 26 at four corners of a two-dimensional photoreceptor array 6a, each photoreceptor cell 26 is divided into two photoreceptor areas 26a, and the position of the light spot 25 with respect to the photoreceptor is detected on the basis of the ratio of the output signals from the photoreceptor areas 261 and 262. Then, according to the position deviation of the light spot 25, the position of the two-dimensional photoreceptor array 6a is adjusted so that each photoreceptor cell of the two-dimensional photoreceptor array 6a follows the displacement of the corresponding light spot 25.

In the technique disclosed in the above-mentioned literature, however, in order to adjust the position of the light spot with accuracy, servo operations in six axes are required for adjusting the positions of the two-dimensional photoreceptor array 6 in the directions of three axes x, y, and z, and the rotation angles around the respective axes, whereby the circuit construction for position adjustment is complicated and, further, the circuit scale is increased.

SUMMARY OF THE INVENTION

The present invention is made to solve the above-mentioned problems and has for its object to provide a two-dimensional photoreceptor array which can deal with position deviations of light spots without performing position adjustment using a servo mechanism.

It is another object of the present invention to provide a simple, small-size, and inexpensive holographic optical information playback apparatus that can deal with position deviations of light spots without using a servo mechanism for adjusting the position of the two-dimensional photoreceptor array.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a two-dimensional photoreceptor array which receives a light spot array comprising plural light spots arranged in a two-dimensional array to detect the light intensity of each light spot, and the two-dimensional photoreceptor array includes a photoreceptor section in which plural photoreceptor cells for detecting the intensities of received lights are arranged so that a photoreceptive area corresponding to the light spot array is formed; and plural photoreceptor cells for detecting the light intensity of each light spot are determined for each light spot, according to the irradiation position of the light spot array onto the photoreceptive area of the photoreceptor section. Therefore, plural photoreceptor cells to be used for detecting the light intensity of each light spot are determined according to the positional relationship between each light spot and the photoreceptor cells, and the two-dimensional photoreceptor array can deal with deviation of the light spot caused by fluctuation of wavelength or the like, whereby the light intensity of the light spot can be accurately detected with a simple construction having no complicated servo mechanism.

According to a second aspect of the present invention, in the two-dimensional photoreceptor array according to the first aspect, the light spot array includes light spots for information playback which include information to be reproduced, and light spots for position detection which are to be used for detecting the irradiation position of the light spot array; and the photoreceptor section comprises an information playback photoreceptor section which receives the light spots for information playback in the light spot array, and outputs a playback signal including the information, and a position detection photoreceptor section which receives the light spots for position detection in the light spot array, and outputs a position detection signal including position information indicating the irradiation position of the light spot array. Therefore, the irradiation position of the light spot array is detected by the position detection photoreceptor section which is different from the information playback photoreceptor section that outputs the playback signal, whereby the irradiation position of the light spot array can be accurately detected with a simple construction by making the density of the photoreceptor cells in the position detection photoreceptor section higher than that in the information playback photoreceptor section.

According to a third aspect of the present invention, in the two-dimensional photoreceptor array according to the second aspect, the light spots for position detection include the information to be reproduced, and the photoreceptor cells constituting the position detection photoreceptor section receive the light spots for position detection, and output a playback signal including the information. Therefore, the playback signal including the information is output also from the position detection photoreceptor section of the two-dimensional photoreceptor array, whereby all of the photoreceptor sections on the two-dimensional photoreceptor array can be utilized for playback of information.

According to a fourth aspect of the present invention, in the two-dimensional photoreceptor array according to the second aspect, the number of photoreceptor cells which are included in the position detection photoreceptor section and are assigned to one light spot to detect the light intensity of the light spot is larger than the number of photoreceptor cells which are included in the information playback photoreceptor section and are assigned to one light spot to detect the light intensity of the light spot. Therefore, the positions of plural photoreceptor cells to be used for detecting the light intensity of each light spot are accurately determined, and an excessive increase in the number of photoreceptor cells in the two-dimensional photoreceptor array is avoided, resulting in reductions in size and cost of the device.

According to a fifth aspect of the present invention, in the two-dimensional photoreceptor array according to the second aspect, in the information playback photoreceptor section, plural photoreceptor cells equal to or more than 3 rows×3 columns are assigned to a photoreceptive area corresponding to one light spot in the light sport array. Therefore, it is avoided that two light spots are mixed into one photoreceptor cell, whereby the light intensity of each light spot can be accurately detected using the output signals from the photoreceptor cells corresponding to each light spot.

According to a sixth aspect of the present invention, in the two-dimensional photoreceptor array according to the second aspect, in the position detection photoreceptor section, plural photoreceptor cells equal to or more than 4 rows×4 columns are assigned to a photoreceptive area corresponding to one light spot in the light sport array. Therefore, the irradiation position of the light spot array can be detected with higher accuracy by the position detection photoreceptor section.

According to a seventh aspect of the present invention, the two-dimensional photoreceptor array according to the first aspect further includes plural adders for adding the output signals from the plural photoreceptor cells, which adders are integrated on a substrate on which the plural photoreceptors are arranged. Therefore, it is possible to suppress an increase in the signal band due to an increase in the number of photoreceptor cells constituting the two-dimensional photoreceptor array, resulting in reductions in size and cost of the device.

According to an eighth aspect of the present invention, there is provided a holographic optical information playback apparatus for reproducing digital data which are recorded on a recording medium in a form of interference fringes of a signal light and a reference light, and the apparatus includes an optical system for irradiating the recording medium with the reference light; and a two-dimensional photoreceptor array which receives a light spot array comprising plural light spots arranged in a two-dimensional array, which is diffracted on the recording medium due to the irradiation of the reference light, and outputs a playback signal including the information recorded on the recording medium; and the two-dimensional photoreceptor array has a photoreceptor section in which plural photoreceptor cells for detecting the intensities of received lights are arranged so that a photoreceptive area corresponding to the light spot array is formed, and determines, for every light spot, plural photoreceptor cells for detecting the light intensity of each light spot, according to the irradiation position of the light spot array onto the photoreceptive area of the photoreceptor section. Therefore, a holographic optical information recording/playback apparatus can be realized in a simple construction having no complicated servo mechanism.

According to a ninth aspect of the present invention, there is provided a holographic optical information recording apparatus which has a spatial light modulator for converting an input light beam into a light beam bundle comprising plural light signal beams each including a playback signal, and records information of the respective light signal beams constituting the light beam bundle as interference fringes on a recording medium, wherein the spatial light modulator modulates the input light beam so that the light beam bundle includes the playback signal, and a position detection signal for detecting the irradiation position of the light beam bundle onto a two-dimensional photoreceptor array which comprises plural photoreceptors arranged in a two-dimensional array, and receives the light beam bundle to output a playback signal. Therefore, it is possible to accurately detect the position of each light spot in the playback signal light spot array which is applied to the two-dimensional photoreceptor array, using the two-dimensional photoreceptor array.

According to a tenth aspect of the present invention, in the holographic optical information recording apparatus according to the ninth aspect, the spatial light modulator generates a light signal beam including the position detection signal, and a light signal beam which does not include the position detection signal but includes the playback signal. Therefore, more information to be played can be recorded on the recording medium.

DETAILED DESCRIPTION OF THE PREFERRED EMBODIMENTS

Embodiment 1

Figure 1:
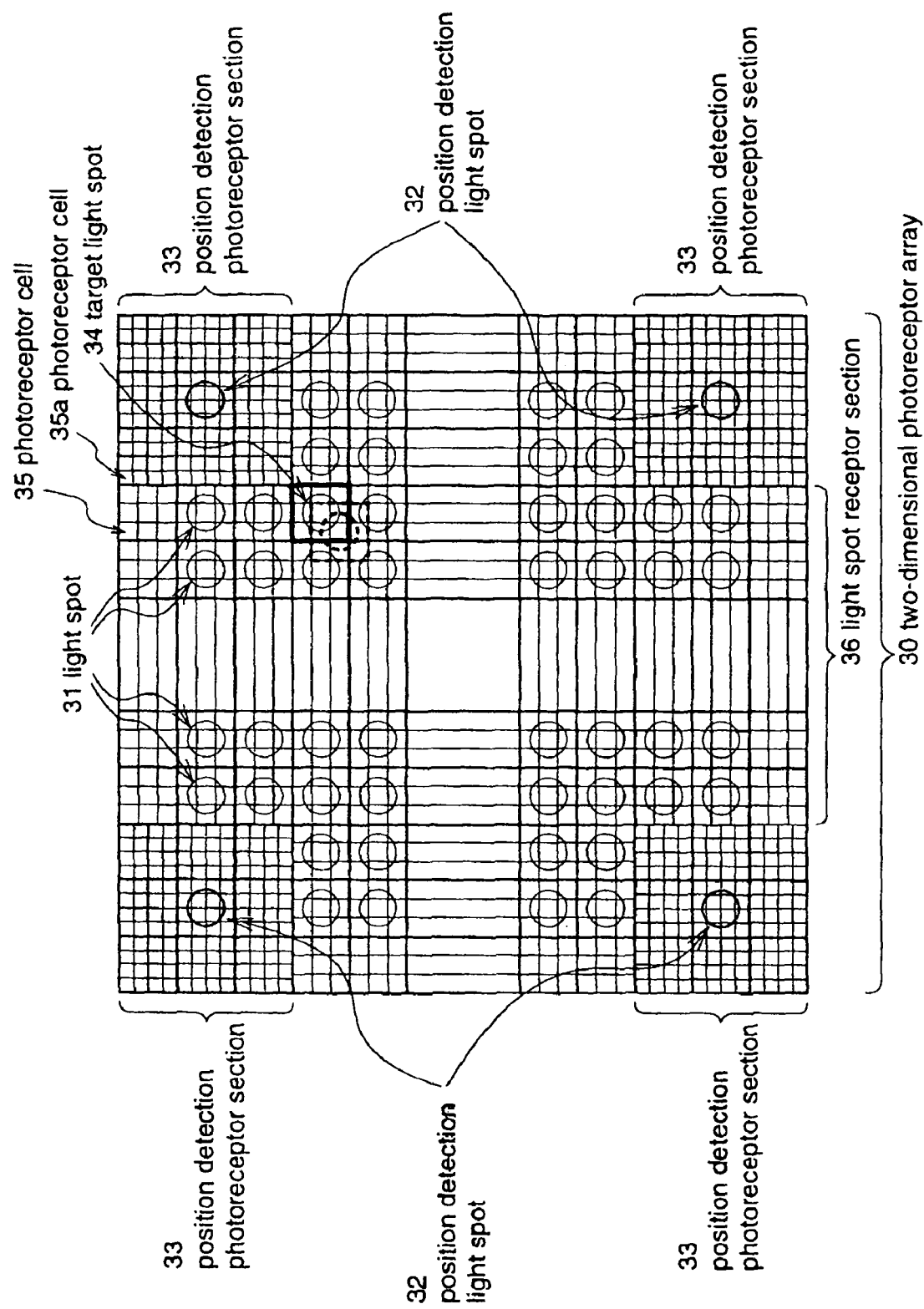
FIG. 1 is a diagram for explaining a two-dimensional photoreceptor array according to a first embodiment of the present invention.

FIG. 1 is a diagram for explaining a two-dimensional photoreceptor array according to a first embodiment of the present invention, illustrating a layout of photoreceptor cells in the two-dimensional photoreceptor array.

Figure 6:
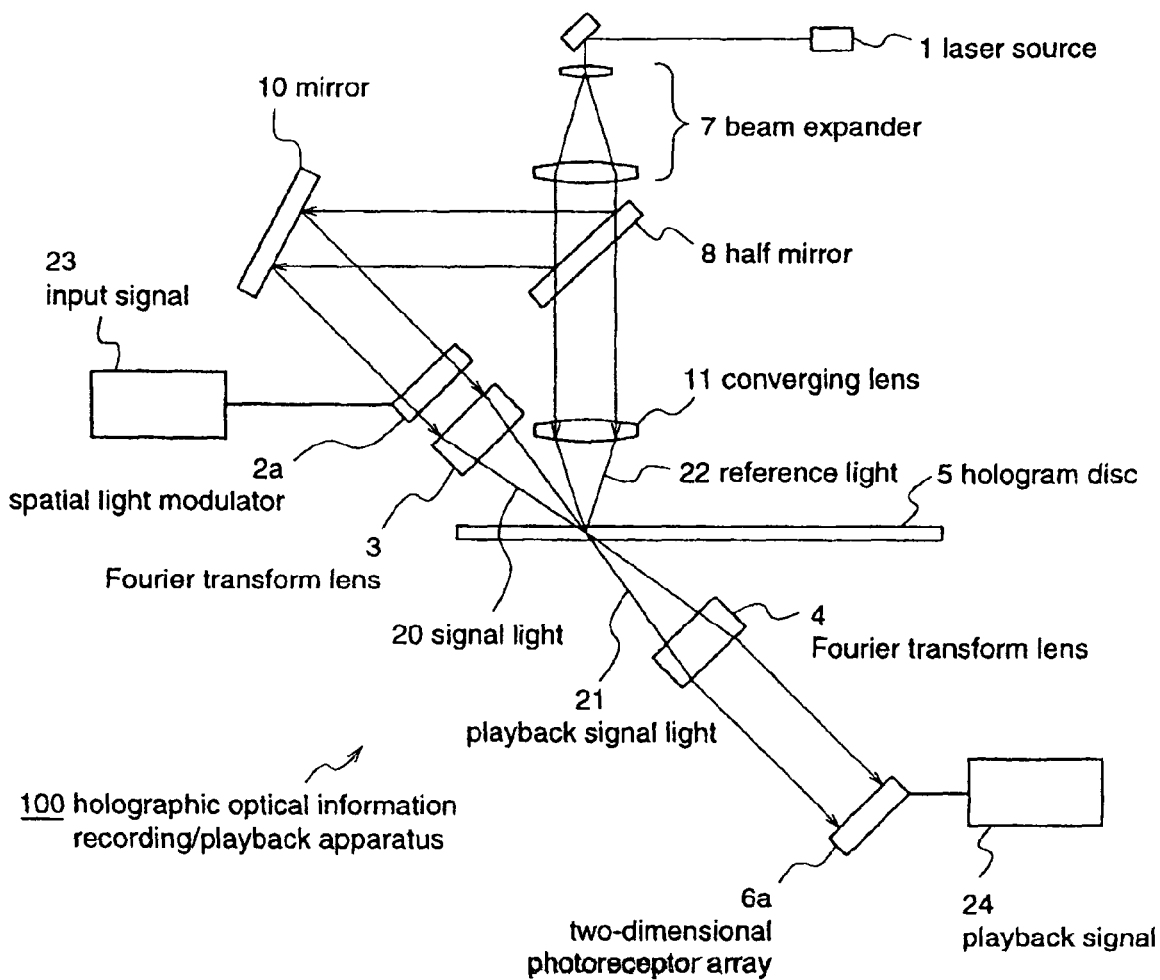
FIG. 6 is a diagram illustrating the schematic structure of a holographic optical information recording/playback apparatus according to a second embodiment of the present invention.
Figure 7:
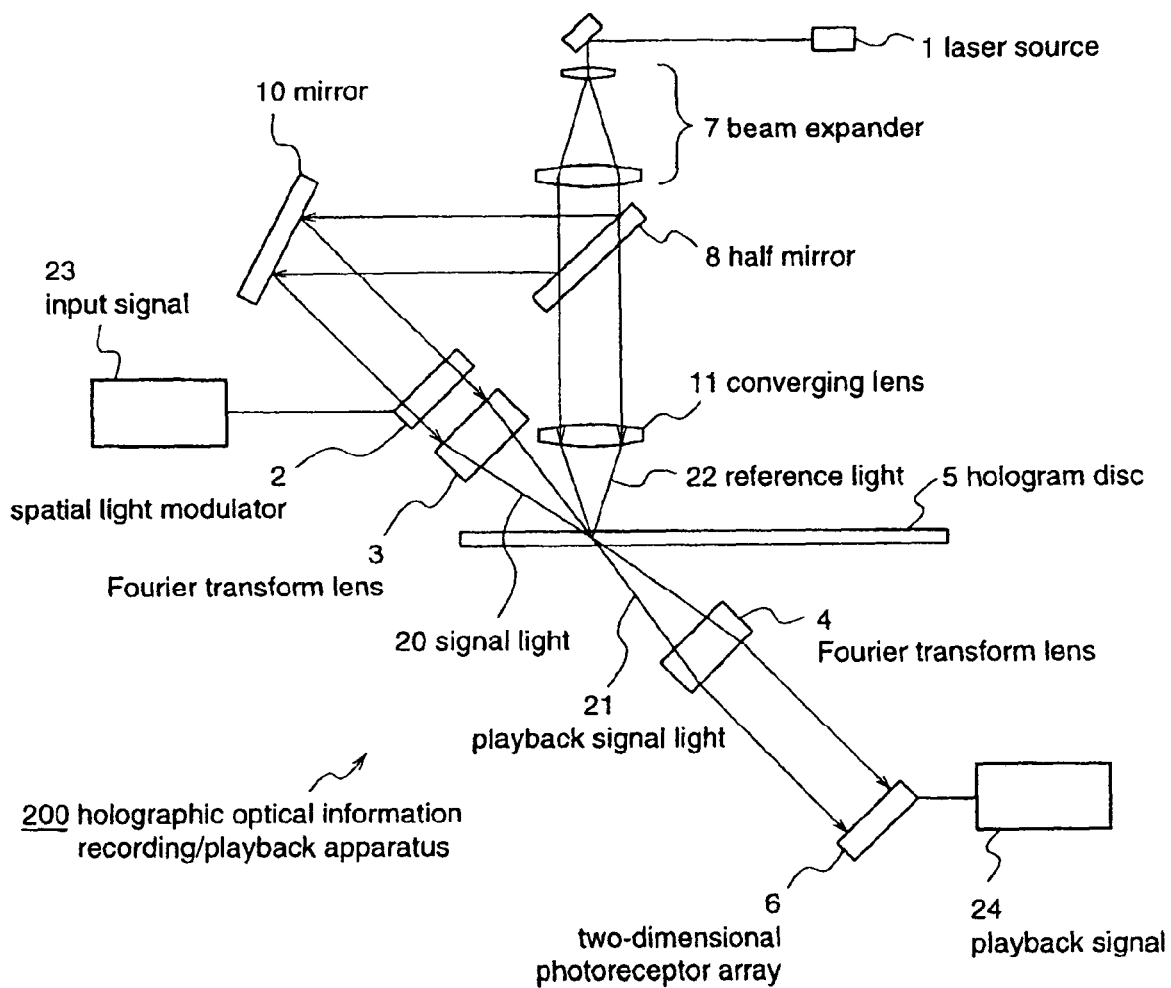
FIG. 7 is a diagram illustrating the schematic structure of the conventional holographic optical information recording/playback apparatus.
Figure 8:
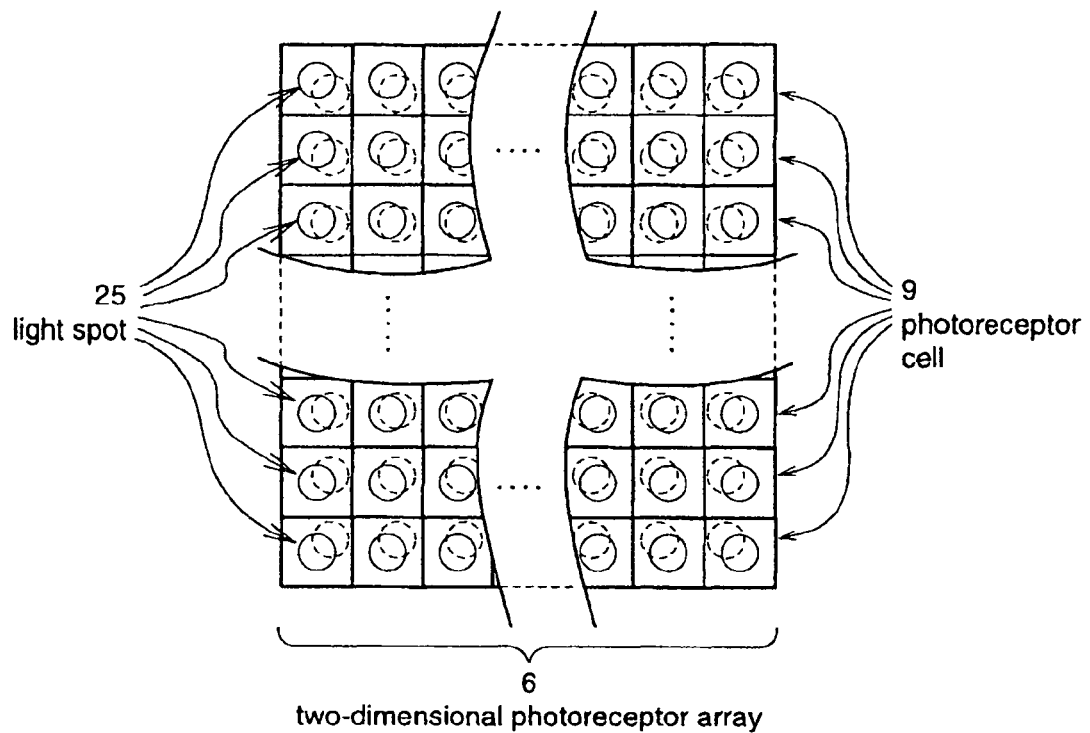
FIG. 8 is a plan view illustrating a playback signal light spot array on a two-dimensional photoreceptor array of the conventional holographic optical information playback apparatus.
Figure 9:
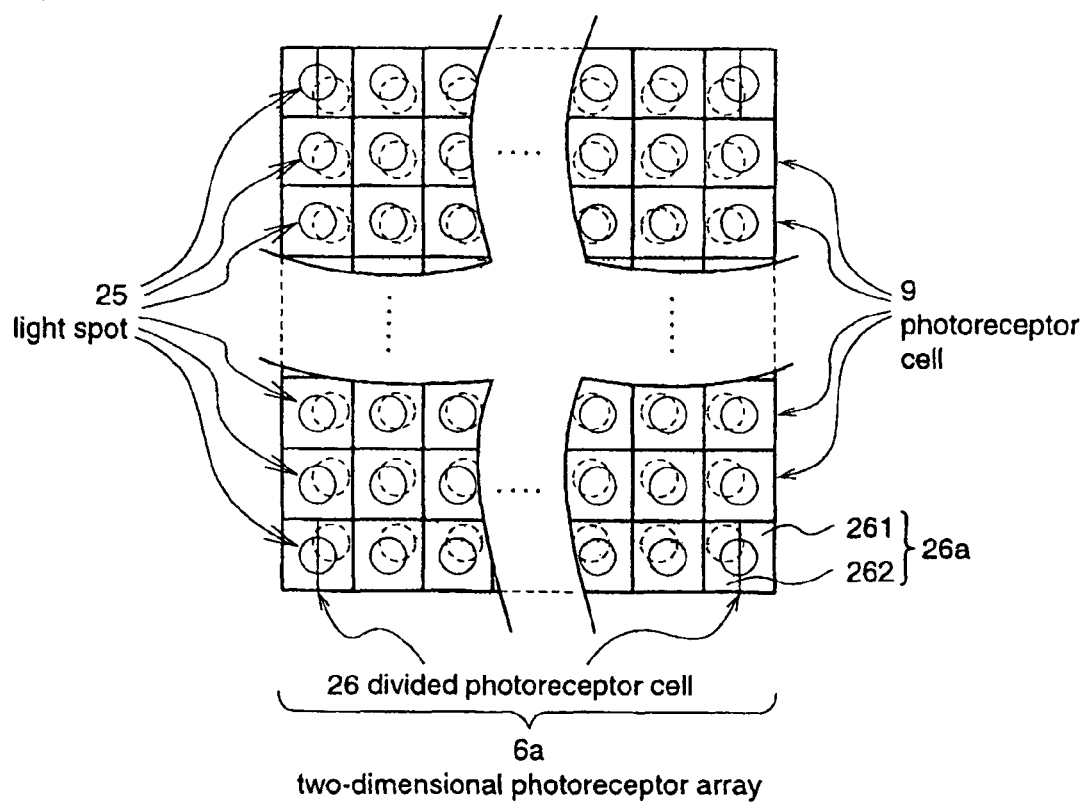
FIG. 9 is a diagram for explaining the two-dimensional photoreceptor array disclosed in Japanese Published Patent Application No. 2002-216359.

The two-dimensional photoreceptor array 30 according to the first embodiment is used as, for example, a two-dimensional photoreceptor array 6a in a holographic optical information recording/playback apparatus 200 shown in FIG. 6.

The two-dimensional photoreceptor array 30 is characterized in that each light spot 31 in a playback signal light spot array from a holographic disc is detected by plural pieces of adjacent photoreceptor cells 35. To be specific, in the two-dimensional photoreceptor array 30, when the playback signal light spot array is applied onto the photoreceptive surface of the array 30, each light spot 31 is assigned a photoreceptor cell that is positioned in the center of an area irradiated with the light spot, and plural photoreceptor cells that are positioned in the vicinity of the photoreceptor cell, as photoreceptor cells for detecting the corresponding light spot. Accordingly, when the irradiation position of the playback signal light spot array on the two-dimensional photoreceptor array changes and thereby the photoreceptor cell that has been positioned in the center of the irradiation area of each light spot before the position change is shifted toward the periphery of each light spot irradiation area, each light spot 31 is again assigned a photoreceptor cell that is positioned in the center of the area irradiated by the light spot, and plural photoreceptor cells that are positioned in the vicinity of the photoreceptor cell, after the position change.

Hereinafter, the two-dimensional photoreceptor array 30 will be described in more detail.

The four corners of the two-dimensional photoreceptor array 30 are position detection photoreceptor sections 33 for detecting the irradiation position of the playback signal light spot array onto the two-dimensional photoreceptor array, and the area of the two-dimensional photoreceptor array 30 other than the position detection photoreceptor sections 33 located at the four corners is a light spot receptor section 36 for detecting the light intensities of the light spots.

In the light spot receptor section 36, one light spot 31 is detected by using nine photoreceptor cells which are arranged in a lattice pattern and form a photodetective area corresponding to the light spot 31, i.e., a photoreceptor cell positioned in the center of the area irradiated with the light spot, and eight photoreceptor cells positioned in the vicinity of the photoreceptor cell.

The surface of each photoreceptor cell is square in shape, and a square area enclosed with a thick line is an area to be a photodetective area for each light spot when there is no position deviation of the playback signal light spot array from the two-dimensional photoreceptor array. In this case, the light intensity of the target light spot 34 enclosed with the thick line is detected by adding the output signals from the nine photoreceptor cells 35, i.e., three vertical pixels×three horizontal pixels constituting the square area enclosed with the thick line in FIG. 1.

On the other hand, when the position of the playback signal light spot array deviates from the two-dimensional photoreceptor array and thereby the target light spot 34 shifts to a position enclosed with a dotted line in FIG. 1, the light intensity of the light spot 34 is detected by adding the output signals from the nine photoreceptor cells 35 constituting the square area enclosed with the dotted line.

Further, each position detection photoreceptor section 33 receives a position detection light spot 32 in the playback signal light spot array with plural photoreceptor cells, and generates a position detection signal for detecting an irradiation position of the playback signal light spot array onto the two-dimensional photoreceptor array. The position detection light spot 32 is a signal light including information for position detection which is modulated by the spatial light modulator and recorded on the medium during recording of information into the medium. For example, the position detection light spot 32 is a signal light having a frequency band of a servo signal whose frequency band is lower than the frequency band of the light spot in the playback signal light spot array.

Then, a change in the position of the playback signal light spot array with respect to the two-dimensional photoreceptor array is detected on the basis of the position detection signal outputted from the position detection photoreceptor section 33, and each light spot 31 is assigned nine photoreceptor cells 35 to be used for detecting the light intensity of the light spot 31 on the basis of the detected position change. The assignment of the photoreceptor cells 35 to be used for detecting the light intensity of each light spot 31 according to the irradiation position of the playback signal light spot array may be performed by a signal processor (not shown) included in the holographic optical information playback apparatus outside the two-dimensional photoreceptor array, or it may be performed by a controller (not shown) mounted on the two-dimensional photoreceptor array.

Furthermore, in order to carry out more accurate position detection, it is desired that the area corresponding to one light spot should be divided into smaller areas in the position detection photoreceptor section 33 than in the light spot receptor section 36. In this first embodiment, as shown in FIG. 1, the area corresponding to one light spot in the position detection photoreceptor sections 33 at the four corners of the two-dimensional photoreceptor array is divided into smaller areas as compared with that in the neighboring light spot receptor section 36. Thereby, the amount of light of the position detection light spot 32 applied to the divided areas can be detected more minutely. As the result, plural photoreceptor cells to be assigned to one light spot can be determined more accurately.

Furthermore, in this first embodiment, when the position detection photoreceptor section 33 is irradiated with the light spot 31 of the playback signal light spot array, the photoreceptor cells constituting the position detection photoreceptor section 33 generates a playback signal for detecting the light intensity of the light spot 31. Thereby, the position detection light spot 32 in the playback signal light spot array includes not only the position detection information but also the target information to be reproduced. Further, even when the light spot for playback is applied onto the position detection photoreceptor 33 due to deviation of the irradiation position of the light spot in the playback signal light spot array, a playback signal corresponding to the light spot can be generated.

The applied light spot is included in the position detection light spot 32 in the playback signal light spot array, as a signal having a frequency band different from those of the position detection information and the playback target information.

Next, a description will be given of the optimum number of photoreceptor cells corresponding to one light spot 31.

Figure 2:
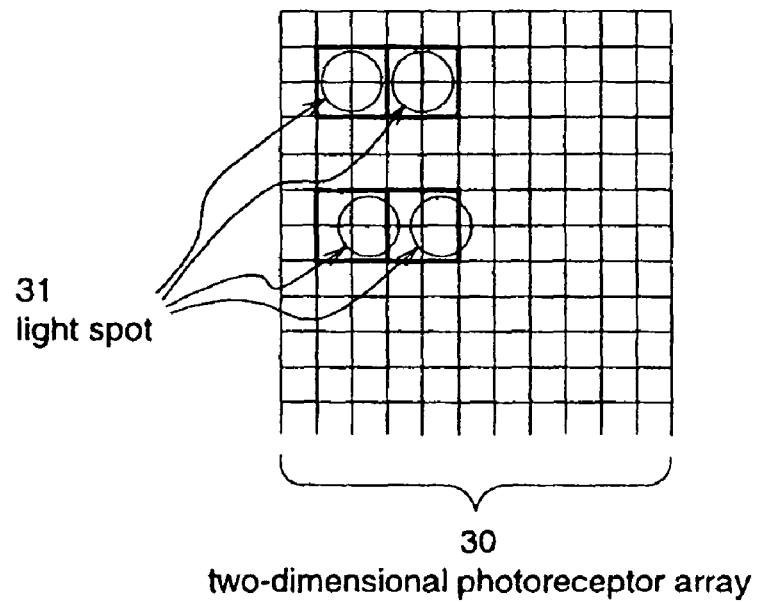
FIG. 2 is a diagram for explaining an example of positional relationship between a two-dimensional photoreceptor array and a playback signal light spot array according to the first embodiment, wherein one light spot is assigned a two by two matrix of photoreceptor cells, i.e., four photoreceptor cells in total.

FIG. 2 is a diagram for explaining an example of positional relationship between the playback signal light spot array and the two-dimensional photoreceptor array 30, wherein one light spot 31 is assigned four photoreceptor cells, i.e., two cells in the vertical direction×two cells in the horizontal direction. In the upper portion of the playback signal light spot array, the center of the light spot 31 agrees with the center of the area comprising four photoreceptor cells that are assigned to this light spot. In the lower portion of the playback signal light spot array, the center of the light spot 31 is on the boundary of the photoreceptor cells in the horizontal direction, and is deviated from the center of the area comprising four photoreceptor cells that are assigned to the light spot.

Usually, when forming a two-dimensional light spot array, the diameter of each light spot is set to about ½ of the interval between adjacent light spots. At this time, assuming that four photoreceptor cells are assigned to one light spot 31 as shown in FIG. 2, if the center of the light spot 31 deviates from the center of the four photoreceptor cells assigned to the light spot, two light spots 31 might be incident on one photoreceptor cell. In this case, it is impossible to accurately detect the light intensity of each light spot 31 by adding the output signals from the respective photoreceptor cells.

Figure 3:
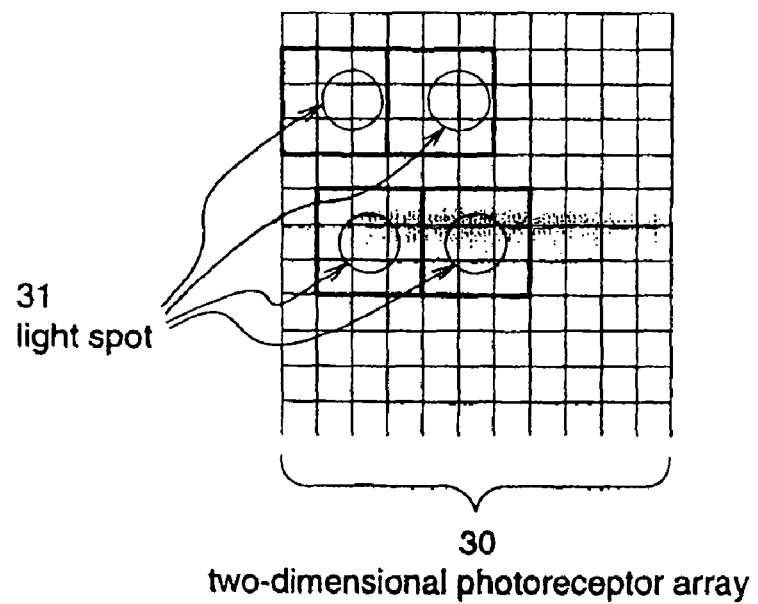
FIG. 3 is a diagram for explaining another example of positional relationship between the two-dimensional photoreceptor array and the playback signal light spot array according to the first embodiment, wherein one light spot is assigned a three by three matrix of photoreceptor cells, i.e., nine photoreceptor cells in total.

FIG. 3 is a diagram for explaining another example of positional relationship between the playback signal light spot array and the two-dimensional photoreceptor array 30, wherein one light spot 31 is assigned nine photoreceptor cells, i.e., three cells in the vertical direction×three cells in the horizontal direction.

In the lower portion of the playback signal light spot array shown in FIG. 3, the center of the light spot 31 agrees with the center of the area comprising the nine photoreceptor cells that are assigned to the optical spot 31. In the upper portion of the playback signal light spot array, the center of the light spot 31 is on the boundary of the photoreceptor cells in the horizontal direction, and is deviated from the center of the area comprising the nine photoreceptor cells that are assigned to the light spot.

When one light spot 31 is assigned nine photoreceptor cells as described above, even if the center of each optical spot 31 deviates from the area comprising the nine photoreceptor cells that are assigned to the light spot, two light spots 31 are not incident on one photoreceptor cell, and each light spot is within the area enclosed in the square of thick line, i.e., the area comprising the corresponding nine photoreceptor cells. Therefore, in this case, the light intensity of the light spot 31 can be accurately detected by adding the output signals from the photoreceptor cells in the square area enclosed in the thick-line.

Therefore, it is desired that the light intensity of one light spot 31 should be detected by a matrix of photoreceptor cells in which three or more photoreceptor cells are arranged in the vertical direction and three or more photoreceptor cells are arranged in the horizontal direction. However, since the device can be easily and inexpensively constituted as the number of photoreceptor cells constituting the two-dimensional photoreceptor array is less, the two-dimensional photoreceptor array should be constituted such that one light spot 31 is assigned a matrix of nine photoreceptor cells comprising three cells in the vertical direction×three cells in the horizontal direction, and the output signals from the respective photoreceptor cells are added.

Further, as described above, in the position detection photoreceptor section comprising the position detection photoreceptor cells, it is desired that the photoreceptive area corresponding to one light spot should be divided into smaller areas as compared with the photoreceptor section comprising the signal detection photoreceptor cells, and therefore, the optimum division of the photoreceptor area corresponding to one light spot is sixteen-part division, i.e., four areas in the vertical direction×four areas in the horizontal direction.

In the two-dimensional photoreceptor array which detects one light spot 31 with plural photoreceptor cells, the number of photoreceptor cells becomes enormous. For example, it is assumed that the playback signal light spot array is a two-dimensional array comprising 1000 light spots in the vertical direction×1000 light spots in the horizontal direction, and one light spot 31 is detected by nine photoreceptor cells. In this case, the number of photoreceptor cells becomes nine millions. In order to read this signal at a rate of 1000 pages per sec, i.e., in order to read one picture image formed at the surface of the two-dimensional photoreceptor array at a rate of 1000 pieces per sec, the two-dimensional photoreceptor array must supply nine billions of analog data to the outside.

In order to carry out such high-speed data supply, a plurality of signal lines are required. In this case, however, the number of pins of the device should be increased, and a signal demultiplexer is required. Thus, detection of one light spot 31 with plural photoreceptor cells causes an increase in cost.

Figure 4:
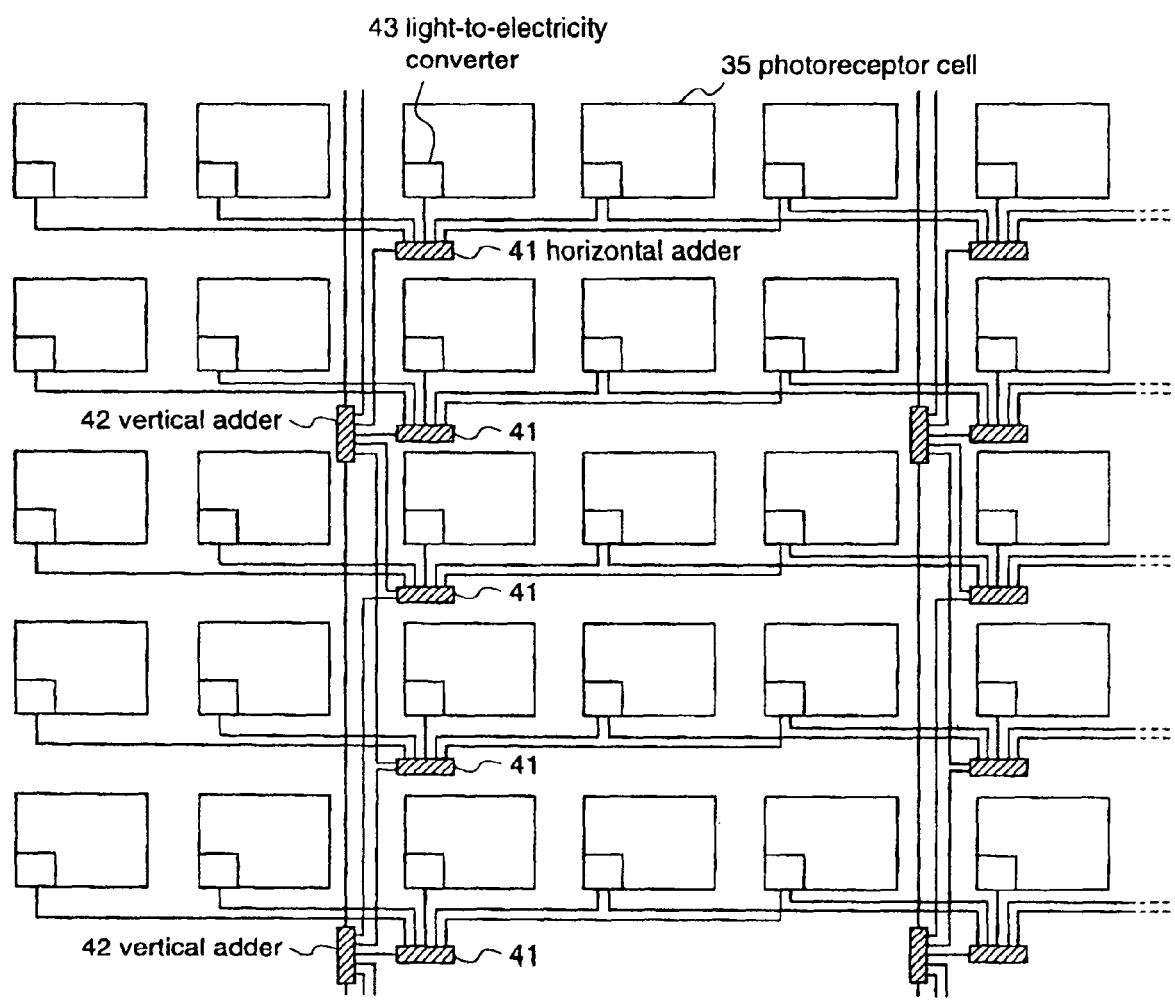
FIG. 4 is a diagram for explaining adders provided on the substrate of the two-dimensional photoreceptor array according to the first embodiment.

Therefore, the two-dimensional photoreceptor array 30 according to the first embodiment is provided with adders for adding the output signals from the respective photoreceptor cells on the substrate of the two-dimensional photoreceptor array 30 as shown in FIG. 4.

FIG. 4 is a diagram for explaining the adders provided on the substrate of the two-dimensional photoreceptor array 30, wherein one light spot 31 is assigned nine photoreceptor cells in total, i.e., three cells in the vertical direction×three cells in the horizontal direction.

With reference to FIG. 4, the adders include horizontal adders 41 and vertical adders 42, and each photoreceptor cell 35 is provided with a light-to-electricity converter 43 which outputs an electricity signal according to the amount of received light.

One horizontal adder 41 is provided for every three photoreceptor cells that are placed adjacent to each other in the horizontal direction. The horizontal adder 41 is connected to the outputs from the light-to-electricity converters of neighboring five photoreceptor cells that are arranged in the horizontal direction, and the output signals from three photoreceptor cells out of the five photoreceptor cells are added, and the result of addition is output to the vertical adder 42. Further, one vertical adder 42 is provided for every three photoreceptor cells that are placed adjacent to each other in the vertical direction. The vertical adder 42 is connected to the neighboring five horizontal adders 41 that are arranged in the vertical direction, and adds the outputs from the adjacent three horizontal adders 41 out of the five horizontal adders 41. Three outputs to be selected are determined according to the irradiation position of each light spot in the playback signal light spot array, which is detected on the basis of the position detection signal outputted from the position detection photoreceptor section 33.

In the above-mentioned construction, each vertical adder 42 outputs a signal obtained by adding the outputs of the nine photoreceptor cells corresponding to each light spot.

Since the two-dimensional photoreceptor array 30 is constructed as described above, the array 30 is required to output only signals as many as the number of light spots 31, whereby increase in the signal frequency band due to increase in the number of photoreceptor cells 35 is suppressed, resulting in reduced price of the device.

Next, a description will be given of the process of determining plural photoreceptor cells to be used for detecting the light intensity of each light spot in the two-dimensional photoreceptor array according to the first embodiment, with reference to FIG. 5.

Figure 5:
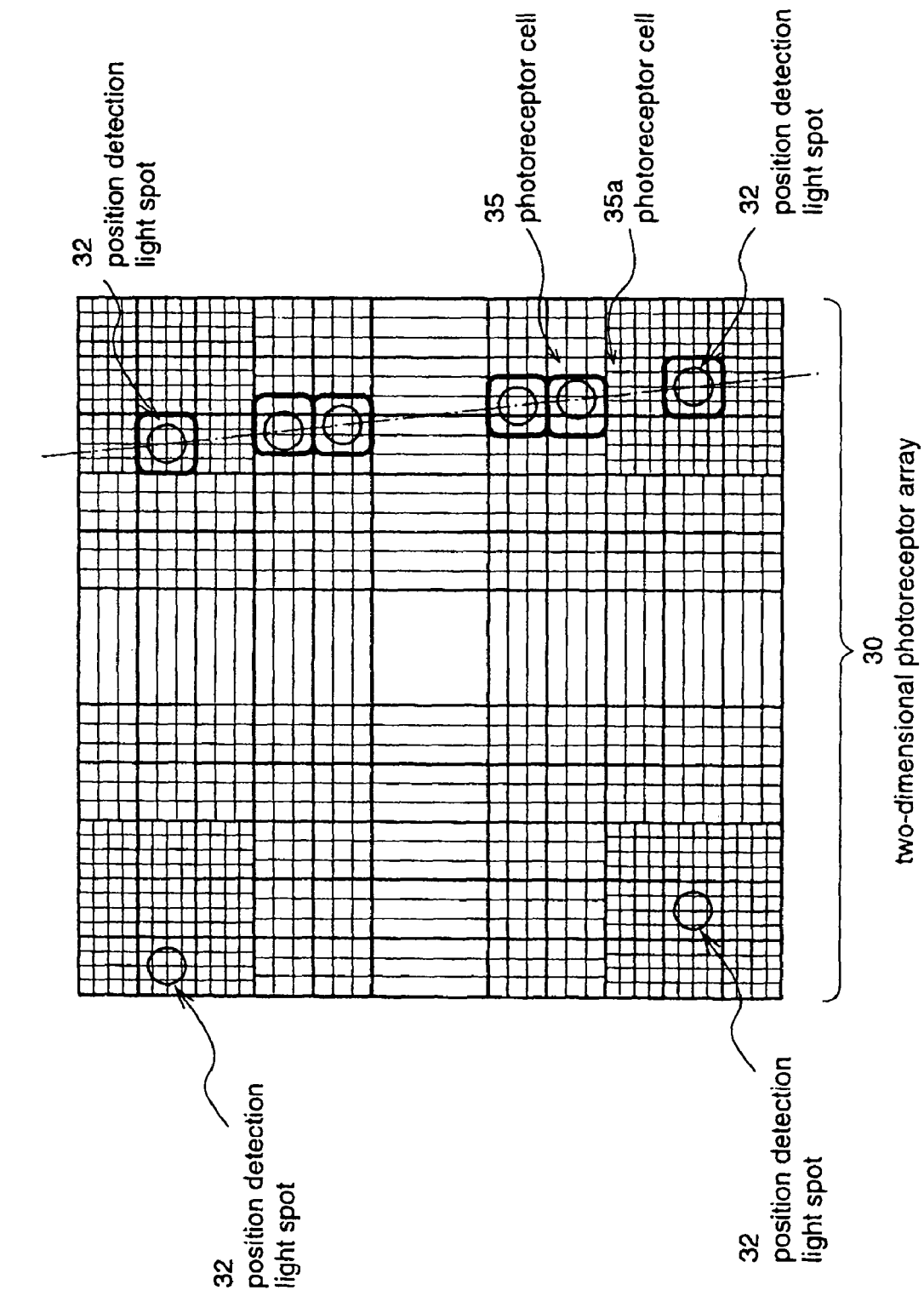
FIG. 5 is a diagram for explaining the process of determining plural photoreceptor cells to be used for detecting the light intensity of each light spot, in the two-dimensional photoreceptor array according to the first embodiment.

FIG. 5 is a diagram for explaining the process of determining plural photoreceptor cells to be used for detecting the light intensity of each light spot in the two-dimensional photoreceptor array 30.

FIG. 5 illustrates the state of the light spot array in the case where the irradiation position of the playback signal light spot array onto the two-dimensional photoreceptor array deviates so as to rotate counterclockwise within the plan view in FIG. 5.

When the position detection photoreceptor section 33 is irradiated with the position detection light spot 32, the position detection photoreceptor section 33 receives the position detection light spot 32 by plural photoreceptor cells 35a to generate a position detection signal. Then, for example, a signal processor possessed by the holographic optical information playback apparatus detects a change in the position of the playback signal light spot array on the basis of the position detection signal outputted from the position detection photoreceptor section 33, and determines, for each light spot 31, nine photoreceptor cells 35 to be used for detecting the light intensity of each light spot 31, on the basis of the detected change in the position of the playback signal light spot array.

In the example shown in FIG. 5, the upper right end light spot 32 shifts to the left, and the amount of position deviation of the lower right end light spot 32 is almost zero. Likewise, the upper left end light spot 32 shifts to the left, and the amount of position error of the lower left end light spot 32 is almost zero.

The positions of the light spots other than the position detection light spots at the four corners of the playback signal light spot array are obtained by interpolation from the position information of the position detection light spots at the four corners.

For example, the position of the light spot 31 placed between the upper right end position detection light spot 32 and the lower right end position detection light spot 32 can be obtained by interpolation from the amount of position error between the two position detection light spots 32. The photoreceptor cells in the area enclosed with the thick line in FIG. 5 are determined as nine photoreceptor cells 35 to be used for detecting the light intensity of each light spot positioned at the right end of the playback signal light spot array.

As described above, in the two-dimensional photoreceptor array according to the first embodiment of the present invention, each light spot 31 in the playback signal light spot array is assigned plural photoreceptor cells according to the irradiation position of the playback signal light spot array, and the light intensity of the light spot 31 is detected using the output signals from the plural photoreceptor cells. Therefore, the two-dimensional photoreceptor array 30 can deal with deviation of the light spot 31, which is caused by fluctuation of wavelength or the like, by appropriately providing each light spot with plural photoreceptor cells to be used for detecting the light intensity of the light spot, whereby detection of the light intensity of each light spot 31 can be accurately carried out by a simple construction having no complicated servo mechanism.

Further, when the two-dimensional photoreceptor array described for the first embodiment is incorporated in a holographic optical information playback apparatus, digital data recorded on the recording medium in the form of interference fringes of signal light and reference light can be reproduced by a simple construction having no complicated servo mechanism, thereby realizing reductions in size and cost of the holographic optical information playback apparatus.

While in the first embodiment the position detection photoreceptor sections 33 are placed at the four corners of the two-dimensional photoreceptor array 30, a position detection photoreceptor section 33 may be placed at only the center of the two-dimensional photoreceptor array. That is, the position detection photoreceptor section 33 may be placed anywhere on the two-dimensional photoreceptor array so long as it can detect the irradiation position of the playback signal light spot array with respect to the two-dimensional photoreceptor array 30.

Embodiment 2

FIG. 6 is a diagram for explaining a holographic optical information recording/playback apparatus according to a second embodiment of the present invention.

The holographic optical information recording/playback apparatus according to the second embodiment employs a two-dimensional photoreceptor array 6a and a spatial light modulator 2a according to the first embodiment, instead of the two-dimensional photoreceptor array 6 and the spatial light modulator 2 of the conventional holographic optical information recording playback apparatus 200.

The two-dimensional photoreceptor array 6a is identical to the two-dimensional photoreceptor array 30 according to the first embodiment.

The spatial light modulator 2a modulates a light beam from the mirror 10 so that the modulated light beam includes information to be reproduced (target information), and position detection information for detecting the irradiation positions of the respective light spots in the playback signal light spot array which is applied to the two-dimensional photoreceptor array. Accordingly, the position detection information is recorded on the hologram disc 5 together with the target information to be reproduced, and is read from the hologram disc 5 when the holographic optical information recording/playback apparatus performs playback.

By the way, since, generally, the amount of deviation of the irradiation position of each light spot in the playback signal light spot array applied to the two-dimensional photoreceptor array gradually increases, it is not necessary to continuously observe the irradiation position of each light spot.

Therefore, it is not necessary for the spatial light modulator 2a to continuously modulate the light beam from the mirror 10 so that the two-dimensional light beam including the position detection information is recorded, but the spatial light modulator 2a may modulate the light beam so that the two-dimensional light beam including the position detection information and the two-dimensional light beam that does not include position detection information but includes only the target information are recorded on the medium at a predetermined ratio. In this case, it is possible to detect the irradiation position of each light spot in the playback signal light spot array at predetermined intervals.

As described above, the holographic optical information recording playback apparatus according to the second embodiment includes the two-dimensional photoreceptor array 30 for providing each light spot 31 in the playback signal light spot array with plural photoreceptor cells according to the irradiation position of the light spot, and the spatial light modulator 2a for modulating an input light beam so as to record the two-dimensional light beam including the position detection information for detecting the irradiation positions of the respective light spots in the playback signal light spot array that is applied onto the two-dimensional photoreceptor array, as well as the target information to be detected as a playback signal during playback, and the information of the two-dimensional light beam is recorded as interference fringes on the recording medium. Therefore, it is possible to provide a simple, small-size, and inexpensive holographic optical information recording/playback apparatus which can deal with position deviations of the light spots, without using a servo mechanism for adjusting the position of the two-dimensional photoreceptor array.

Further, in this second embodiment, the spatial light modulator 2a records the two-dimensional light beam including the position detection information and the two-dimensional light beam which does not include the position detection information but includes only the playback target information, on the recording medium, so that the ratio of the recorded information by the two beams becomes constant. Therefore, more playback target information can be recorded on the recording medium.

Further, while in this second embodiment the holographic optical information recording/playback apparatus which performs recording and playback of digital data on/from the recording medium has been described, the present invention is also applicable to a holographic optical information recording apparatus that performs only recording of digital data or a holographic optical information playback apparatus that performs only playback of digital data.

The two-dimensional photoreceptor array according to the present invention, and the holographic optical information playback apparatus and the holographic optical information playback apparatus which employ the two-dimensional photoreceptor array are applicable to a large-capacity external storage device for computer, a moving picture recording/playback apparatus, a moving picture playback apparatus, or a moving picture recording apparatus.

What is claimed is:

1. A two-dimensional photoreceptor array which receives a light spot array that includes plural light spots arranged in a two-dimensional array to detect the light intensity of each light spot, the two-dimensional photoreceptor array comprising:
   plural photoreceptor cells for detecting intensities of received lights from a light spot array; and
   a photoreceptor section in which said plural photoreceptor cells for detecting the intensities of received lights are arranged so as to form a photoreceptive area corresponding to the light spot array,
   wherein said plural photoreceptor cells for detecting the light intensity are arranged to detect the light intensity of each light spot of the light spot array and are determined from within the photoreceptive area, for each light spot, according to an irradiation position of the light spot array onto the photoreceptive area of said photoreceptor section,
   the light spot array includes light spots for performing information playback which include information to be reproduced, and light spots for position detection which are to be used for detecting the irradiation position of the light spot array, and
   said photoreceptor section comprises:
      an information playback photoreceptor section which receives the light spots for performing information playback in the light spot array, and outputs a playback signal including the information; and
      a position detection photoreceptor section which receives the light spots for position detection in the light spot array, and outputs a position detection signal including position information indicating the irradiation position of the light spot array,
   wherein the plural photoreceptor cells include photoreceptor cells for receiving the light spots for performing information playback that are determined from within said information playback photoreceptor section on the basis of the position detection signal,
   said information playback photoreceptor section, plural photoreceptor cells equal to or more than 3 rows×3 columns are assigned to a photoreceptive area corresponding to one light spot in the light sport array.

2. A two-dimensional photoreceptor array in which receives a light spot array that includes plural light spots arranged in a two-dimensional array to detect the light intensity of each light spot, the two-dimensional photoreceptor array comprising:
   plural photoreceptor cells for detecting intensities of received lights from a light spot array; and
   a photoreceptor section in which said plural photoreceptor cells for detecting the intensities of received lights are arranged so as to form a photoreceptive area corresponding to the light spot array,
   wherein said plural photoreceptor cells for detecting the light intensity are arranged to detect the light intensity of each light spot of the light spot array and are determined from within the photoreceptive area, for each light spot, according to an irradiation position of the light spot array onto the photoreceptive area of said photoreceptor section,
   wherein the light spot array includes light spots for performing information playback which include information to be reproduced, and light spots for position detection which are to be used for detecting the irradiation position of the light spot array, and
   said photoreceptor section comprises:
      an information playback photoreceptor section which receives the light spots for performing information playback in the light spot array, and outputs a playback signal including the information; and
      a position detection photoreceptor section which receives the light spots for position detection in the light spot array, and outputs a position detection signal including position information indicating the irradiation position of the light spot array,
   wherein the plural photoreceptor cells include photoreceptor cells for receiving the light spots for performing information playback that are determined from within said information playback photoreceptor section on the basis of the position detection signal,
   said position detection photoreceptor section, plural photoreceptor cells equal to or more than 4 rows×4 columns are assigned to a photoreceptive area corresponding to one light spot in the light sport array.

3. A holographic optical information playback apparatus for reproducing digital data which are recorded on a recording medium in a form of interference fringes of a signal light and a reference light, the holographic optical information playback apparatus, comprising:
   an optical system for irradiating the recording medium with the reference light; and
   a two-dimensional photoreceptor array which has a photoreceptor section in which plural photoreceptor cells for detecting the intensities of received lights are arranged so that a photoreceptive area is formed, and receives a light spot array with plural light spots arranged in a two dimensional array, which is diffracted on the recording medium due to the irradiation of the reference light, and outputs a playback signal including the information recorded on the recording medium, the photoreceptor section comprises:

plural position detection photoreceptor sections which receive the light spots for position detection in the light spot array, and output a position detection signal including position information indicating the irradiation position of the light spot array; and wherein plural position detection photoreceptor sections calculate for detecting the irradiation position of the light array for performing information playback by interpolating the irradiation position of light spots for performing information playback at the information playback photoreceptor from the incident position of the detected light spots for performing position detection, and the plural photoreceptor cells are determined, for every light spot, said plural photoreceptor cells for detecting the light intensity of the light spot for performing information playback from within said information playback photoreceptor section, according to the irradiation position of the light spot for performing information playback.

4. A holographic optical information playback apparatus for reproducing digital data which are recorded on a recording medium in a form of interference fringes of a signal light and a reference light, the holographic optical information playback apparatus, comprising:

an optical system for irradiating the recording medium with the reference light; and a two-dimensional photoreceptor array which has a photoreceptor section in which plural photoreceptor cells for detecting the intensities of received lights are arranged so that a photoreceptive area is formed, and receives a light spot array with plural light spots arranged in a two dimensional array, which is diffracted on the recording medium due to the irradiation of the reference light, and outputs a playback signal including the information recorded on the recording medium, the photoreceptor section comprises:

a position detection photoreceptor section which receives the light spots for position detection in the light spot array, and outputs a position detection signal including position information indicating the irradiation position of the light spot array; and said information playback photoreceptor section, plural photoreceptor cells equal to or more than 3 rows×3 columns are assigned to a photoreceptive area corresponding to one light spot in the light spot array, wherein a position detection photoreceptor section calculates for detecting the irradiation position of the light array for performing information playback by interpolating the irradiation position of light spots for performing information playback at the information playback photoreceptor from the incident position of the detected light spots for performing position detection, and the plural photoreceptor cells are determined, for every light spot, said plural photoreceptor cells for detecting the light intensity of the light spot for performing information playback from within said information playback photoreceptor section, according to the irradiation position of the light spot for performing information playback.

5. A holographic optical information playback apparatus for reproducing digital data which are recorded on a recording medium in a form of interference fringes of a signal light and a reference light, the holographic optical information playback apparatus, comprising:

an optical system for irradiating the recording medium with the reference light; and a two-dimensional photoreceptor array which has a photoreceptor section in which plural photoreceptor cells for detecting the intensities of received lights are arranged so that a photoreceptive area is formed, and receives a light spot array with plural light spots arranged in a two dimensional array, which is diffracted on the recording medium due to the irradiation of the reference light, and outputs a playback signal including the information recorded on the recording medium, the photoreceptor section comprises:

a position detection photoreceptor section which receives the light spots for position detection in the light spot array, and outputs a position detection signal including position information indicating the irradiation position of the light spot array; and the position detection photoreceptor section, plural photoreceptor cells equal to or more than 4 rows×4 columns are assigned to a photoreceptive area corresponding to one light spot in the light spot array, wherein a position detection photoreceptor section calculates for detecting the irradiation position of the light array for performing information playback by interpolating the irradiation position of light spots for performing information playback at the information playback photoreceptor from the incident position of the detected light spots for performing position detection, and the plural photoreceptor cells are determined, for every light spot, said plural photoreceptor cells for detecting the light intensity of the light spot for performing information playback from within said information playback photoreceptor section, according to the irradiation position of the light spot for performing information playback.

* * * * *